(12) United States Patent
Yasar

(10) Patent No.: US 12,023,958 B2
(45) Date of Patent: Jul. 2, 2024

(54) SPHERICAL WHEEL

(71) Applicant: Serhan Kaptan Yasar, Izmir (TR)

(72) Inventor: Serhan Kaptan Yasar, Izmir (TR)

( * ) Notice: Subject to any disclaimer, the term of this patent is extended or adjusted under 35 U.S.C. 154(b) by 694 days.

(21) Appl. No.: 17/043,398

(22) PCT Filed: May 21, 2019

(86) PCT No.: PCT/TR2019/050351
§ 371 (c)(1),
(2) Date: Sep. 29, 2020

(87) PCT Pub. No.: WO2020/005187
PCT Pub. Date: Jan. 2, 2020

(65) Prior Publication Data
US 2021/0023877 A1    Jan. 28, 2021

(30) Foreign Application Priority Data
May 22, 2018   (TR) .................. 2018/07256

(51) Int. Cl.
| | | |
|---|---|---|
| *B60B 19/00* | (2006.01) | |
| *B60B 19/14* | (2006.01) | |
| *B60B 27/00* | (2006.01) | |
| *B60B 27/02* | (2006.01) | |

(52) U.S. Cl.
CPC .......... *B60B 19/14* (2013.01); *B60B 27/0005* (2013.01); *B60B 27/0078* (2013.01); *B60B 27/02* (2013.01); *B60B 2900/212* (2013.01); *B60B 2900/325* (2013.01)

(58) Field of Classification Search
CPC .. B60B 27/0078; B60B 27/0005; B60B 27/02
See application file for complete search history.

(56) References Cited

U.S. PATENT DOCUMENTS

| | | | |
|---|---|---|---|
| 2,909,389 A |  | 10/1959 | Wilborn |
| 2,994,545 A | * | 8/1961 | Gass ...................... B62D 61/02 |
| | | | 301/1 |
| 3,789,947 A |  | 2/1974 | Blumrich |
| 5,667,280 A | * | 9/1997 | Hansen ................. A63C 17/223 |
| | | | 152/382 |

(Continued)

FOREIGN PATENT DOCUMENTS

| | | |
|---|---|---|
| CN | 201179819 Y | 1/2009 |
| CN | 106004237 A | 12/2016 |
| JP | 63203401 A * | 8/1988 |

OTHER PUBLICATIONS

International Search Report for corresponding PCT/TR2019/050351 dated Feb. 7, 2020.

(Continued)

*Primary Examiner* — Scott A Browne
(74) *Attorney, Agent, or Firm* — Egbert, McDaniel & Swartz, PLLC

(57) ABSTRACT

Disclosed is a wheel having a sphere at the hub of the rim which can rotate in all directions by the ball bearing it is supported by, wherein the sphere is produced from various metals, carbon fibre, etc. material. The wheel helps to prevent vehicles from skidding off tracks at turns even at high speeds or to prevent accidents that may occur as a result of swiping of vehicles with each other particularly during competitive racing.

1 Claim, 4 Drawing Sheets

(56) References Cited

U.S. PATENT DOCUMENTS

| | | | |
|---|---|---|---|
| 5,764,049 A | 6/1998 | Hofmann et al. | |
| 5,951,027 A * | 9/1999 | Oyen | A63C 17/0046 |
| | | | 280/11.208 |
| 7,108,331 B2 * | 9/2006 | Hurwitz | A63C 17/223 |
| | | | 152/87 |
| 8,496,299 B2 | 7/2013 | Brudniok | |
| 11,020,651 B2 * | 6/2021 | Smith | A63C 17/223 |
| 2014/0252844 A1 | 9/2014 | Riwan et al. | |

OTHER PUBLICATIONS

Written Opinion of the International Searching Authority for corresponding PCT/TR2019/050351 Feb. 7, 2020.

* cited by examiner

SPHERICAL WHEEL

TECHNICAL FIELD

The invention is related to a wheel comprising a sphere at the hub of the rim, produced from light metal, carbon fibre etc. material which can rotate in all directions.

The invention is particularly related to a wheel having a sphere in the hub of the rim, which can fit into the metal or concrete barriers having concave grooves at the mid-section, which shall be positioned specifically at the outer edges of the tracks on race ways and which thereby prevents skidding and sliding off the tracks of the racing cars and which reduces the requirement to reduce speed and aims to increase overall speed at curves and laps.

The invention is particularly related to a wheel which enables to prevent accidents that might occur due to side-swiping of the cars with each other and/or of wheels during curves, overtaking other cars and especially during the start of the race.

PRIOR ART

The rim is one of the most important parts of a vehicle that is required in order for automobiles to move. The wheels are mounted to this section. It is an essential part for the automobile to move. The rims are located at the axle section of automobiles.

In the United States Patent document numbered US2014252844 of the known state of the art a wheel which moves by means of the metal balls which enable movement in all directions and the controlling of the wheel which can move in all directions with a motor is described.

In the United States Patent document numbered U.S. Pat. No. 3,789,947 of the known state of the art a wheel which shall maximize the rotation capacities of vehicles is mentioned. Balls, which enable the rotation in all directions, are provided in this wheel rim.

In the United States Patent document numbered U.S. Pat. No. 8,496,299 of the known state of the art a wheel system which can move in all directions and the operation method of the parts of the system which enable movement in all directions are described.

However, any kind of apparatus which can prevent accidents during close contact that may occur during a race or which can prevent skidding when turning corners at high speeds is not present in any of the wheels disclosed in the documents recited above. Therefore, the development of a wheel which comprises a sphere produced from carbon fibre, etc. material which can rotate in all directions located in the hub of the rim has been required.

AIMS OF THE INVENTION

The aim of the invention is to provide a wheel comprising a sphere which can rotate in all directions and which is located at the hub of the rim.

Another aim of the invention is to provide a wheel having a structure which prevents accidents that may occur as a result of sideswiping of cars or which prevents the skidding of cars at turns even at high speed especially in race tracks by means of the sphere which can rotate in all directions, located at the hub of the rim.

BRIEF DESCRIPTION OF THE SEVERAL VIEWS OF THE DRAWINGS

The wheel provided to reach the aims of the invention, comprising a sphere which can rotate in all directions and which is located at the hub of the rim has been illustrated in the attached figures.

According to these figures.

Figure 1:
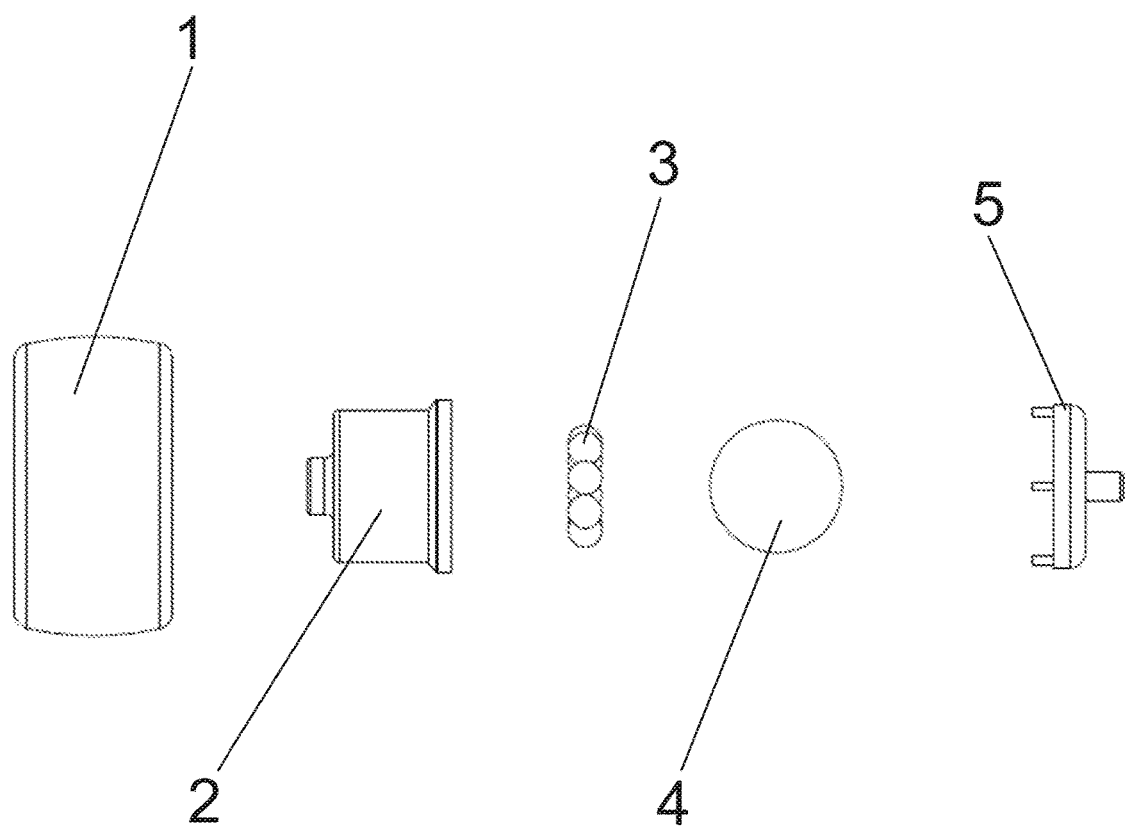
FIG. 1: Is the blown up view of the wheel subject to the invention.
Figure 2:
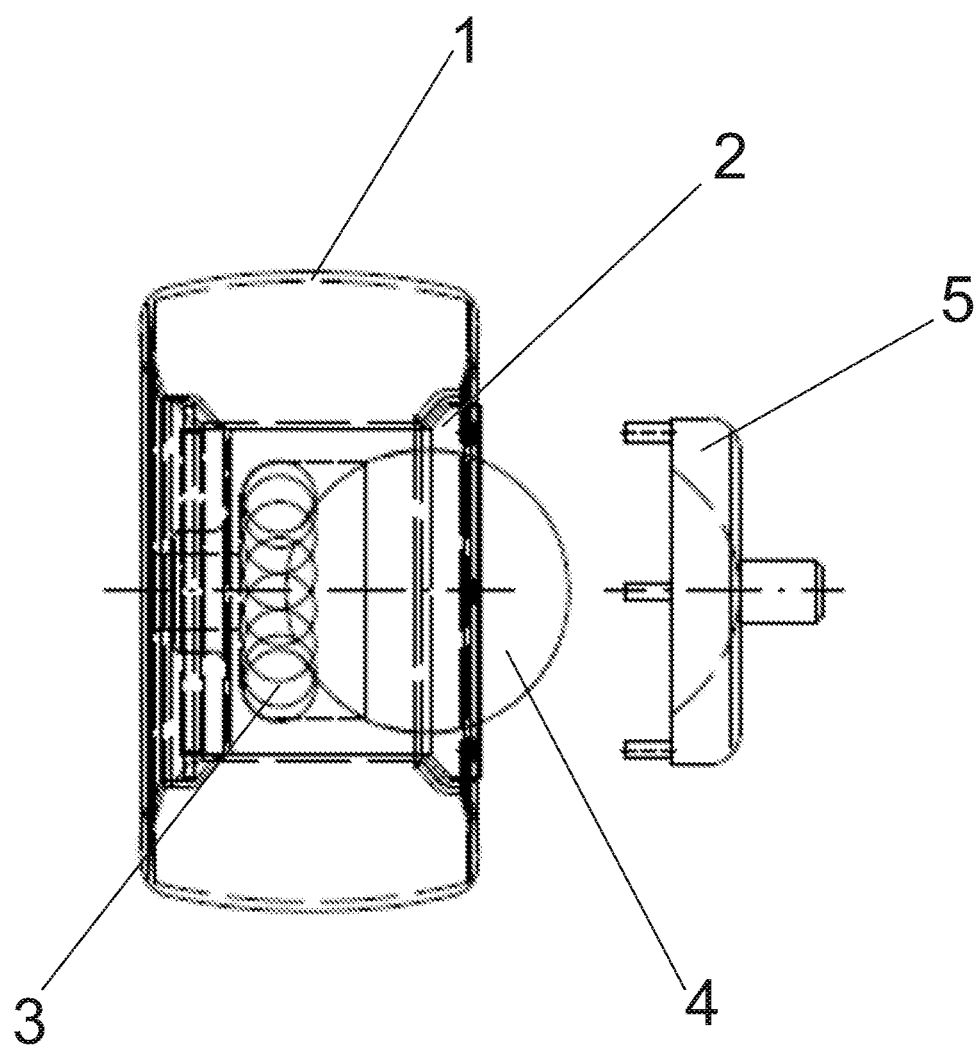
FIG. 2: Is the front view of the wheel subject to the invention.

The parts in the figures have each been numbered and their references have been listed below.

1. wheel with rubber tire
2. Rim
3. Ball bearing
4. Sphere
5. Rim assembling-disassembling apparatus.

DETAILED DESCRIPTION OF THE INVENTION

The invention is a wheel with a spherical rim comprising;
- a wheel with a rubber tire thereon (1) located at the outermost section of the wheel assembly, a rim (2) coupled to the wheel (1) and attached to the axle of the vehicle by means of its coupling section located in the wheel (1),
- comprising a ball bearing (3), located inside the rim (2), and
- a sphere (4) connected to the ball bearing (3) located in the hub of the rim (2).

The ball bearing (3) of the wheel subject to the invention is used in order to minimize the friction caused by the sphere (4) which rotates inside the rim (2).

The wheel subject to the invention comprises a sphere (4) made of metal, light metals, carbon fibre etc. material which can rotate in all directions and which is located inside the rim (2).

The wheel subject to the invention allows the rim (2) and the wheel with rubber tire (1) to be easily mounted to and disassembled from the vehicle (into the standard coupling devices of race cars at the end of the axles of the vehicle) by means of the rim assembly—disassembly apparatus.

In the wheel subject to the invention an assembly-disassembly apparatus (5) is used with a standard power drill in order to assemble or disassemble the rim (2) together with the sphere (4) located at the hub of the rim (2).

Figure 3:
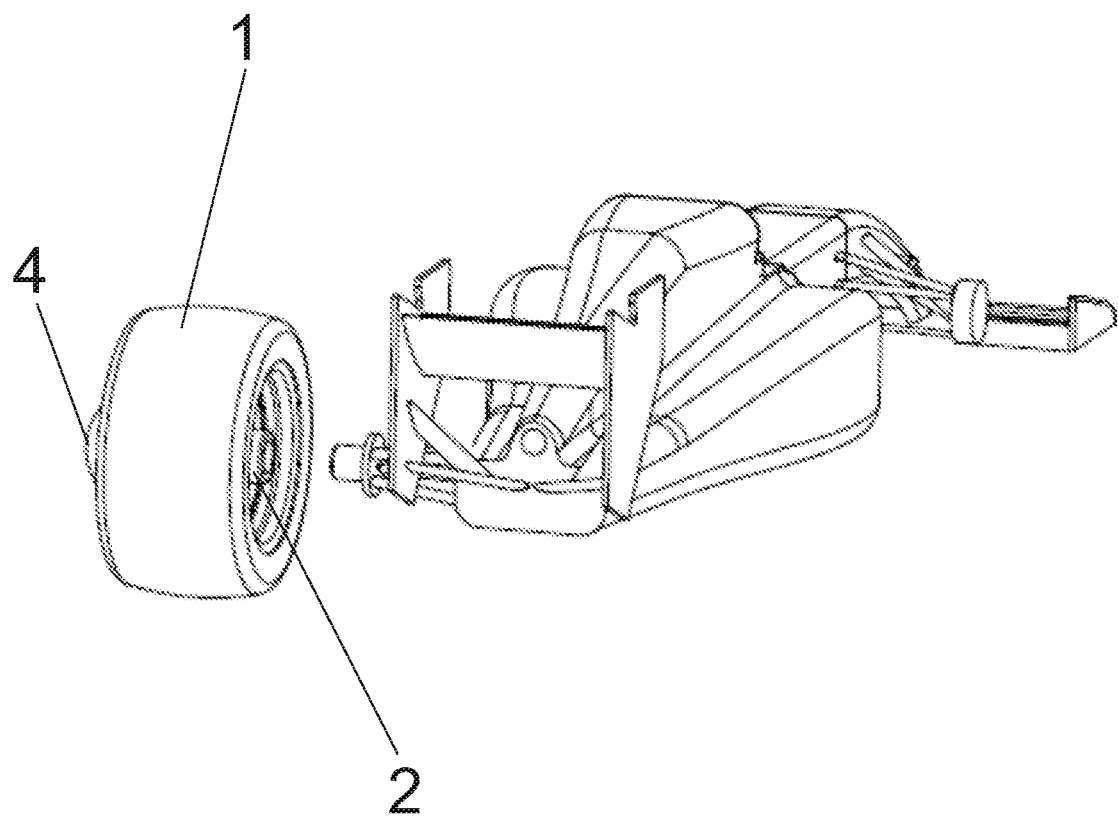
FIG. 3: Is the perspective view showing the connection of the wheel subject to the invention to the race car.
Figure 4:
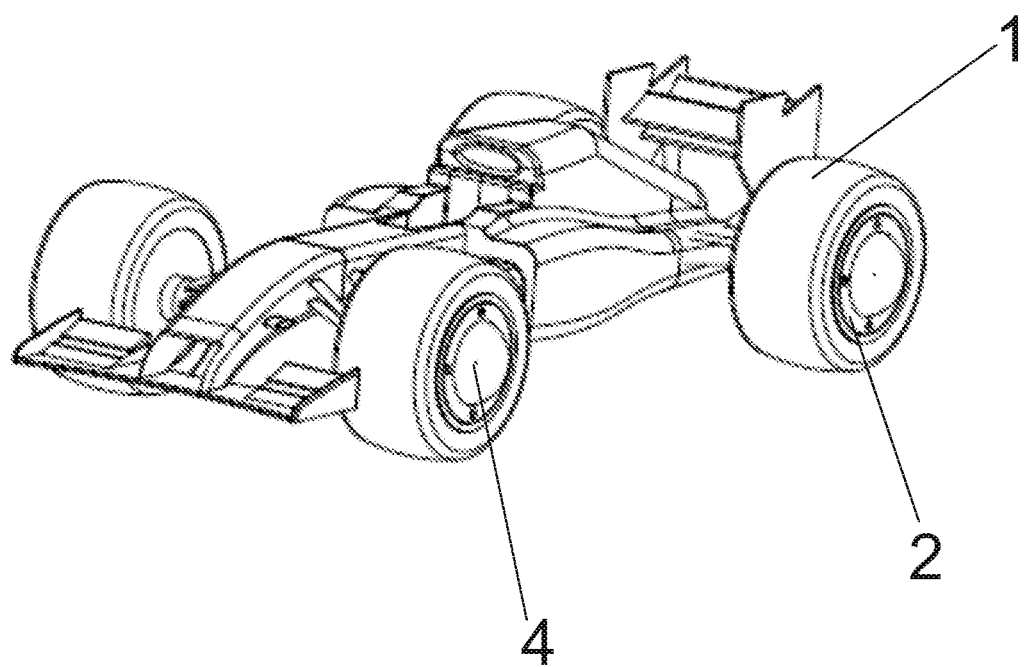
FIG. 4: Is the view of the wheel subject to the invention when it is mounted to the race car.

By means of the coupling section of the rim (2) of the wheel subject to the invention, the wheel is coupled to the axle section of the vehicle. (FIG. 3)

The wheel subject to the invention provides a very different feature to the rim designs of race cars such as F1, Formula E, and F2, NASCAR, etc, which have special designs to be used particularly in race tracks.

Following the addition of steel/concrete railings fitting to the shape of the spherical rims produced at the turns and curves of race tracks, it shall be enabled for these cars to enter into turns at high speeds without skidding or rolling over.

Moreover, it is aimed by this invention to increase security and to increase excitement in races and by allowing breaking of previous lap records.

The sphere (4) made of the strongest light metals or carbon alloy materials which can rotate in all directions in the hubs of rims (2) of wheels subject to the invention, allows the vehicles to turn at high speeds without skidding off by leaning on the rails at the edges of the tracks in raceways, and eliminates the likelihood of accidents and disqualifications that can be encountered as a result of brushing of the wheels or cars with each other that may occur at the start of the race and/or during overtaking and curves.

The invention claimed is:
1. A wheel assembly for a vehicle, the wheel assembly comprising:
   a wheel with a rubber tire thereon, the rubber tire having a tread, the wheel having a first side and a second side, the wheel having a hub adapted to attach to an axle of the vehicle at the first side thereof, the second side having an opening facing outwardly from the vehicle;
   a ball bearing positioned inside the wheel;
   a sphere positioned against the ball bearing and inside the wheel, wherein a portion of the sphere extends outwardly beyond the opening of the wheel, such that a surface of the sphere is unobstructed and is adapted to contact a surface, external to the vehicle, fitted to a shape of the sphere, the sphere being rotatable in all directions.

\* \* \* \* \*